United States Patent [19]

Hougen

[11] Patent Number: 4,514,120

[45] Date of Patent: Apr. 30, 1985

[54] CHIP BREAKER FOR ANNULAR HOLE CUTTING TOOLS

[76] Inventor: Everett D. Hougen, G-5072 Corunna Rd., Flint, Mich. 48504

[21] Appl. No.: 372,975

[22] Filed: Apr. 29, 1982

[51] Int. Cl.³ .......................... B23B 47/34; B23C 9/00
[52] U.S. Cl. ..................................... 409/137; 408/67; 408/72 B; 408/241 B
[58] Field of Search ............... 409/137; 408/67, 241 B, 408/710, 241 R, 115 B, 72 B; 407/2, 3, 4; 29/DIG. 52

[56] References Cited

U.S. PATENT DOCUMENTS

| | | | |
|---|---|---|---|
| 1,612,205 | 12/1926 | Muth | 408/67 |
| 1,617,554 | 2/1927 | Swartz | 29/DIG. 52 |
| 2,231,747 | 2/1941 | Bauer | 407/2 X |
| 2,375,367 | 5/1945 | Johnson | 408/241 X |
| 2,669,889 | 2/1954 | Huller | 408/72 B |
| 3,301,101 | 1/1967 | McEwen | 408/67 |
| 3,874,808 | 4/1975 | Zaccarpelli et al. | 408/72 B |

FOREIGN PATENT DOCUMENTS

| | | | |
|---|---|---|---|
| 876352 | 9/1953 | Fed. Rep. of Germany | 408/72 B |
| 946811 | 8/1982 | U.S.S.R. | 408/67 |

Primary Examiner—William R. Briggs
Attorney, Agent, or Firm—Barnes, Kisselle, Raisch, Choate, Whittemore & Hulbert

[57] ABSTRACT

Holes are cut in a metal workpiece by means of an annular cutter. The chips formed are broken and prevented from wrapping and accumulating around the cutter and its arbor by means of a chip breaker in the form of a lug or plate positioned generally radially to the cutter and extending into close proximity with the outer periphery of the cutter.

10 Claims, 11 Drawing Figures

CHIP BREAKER FOR ANNULAR HOLE CUTTING TOOLS

This invention relates to a chip breaker for annular hole cutters.

Annular hole cutters, unlike most drills, frequently pose serious problems in connection with chip removal, especially when cutting holes in metal on a production basis. Most drills are provided with only two cutting edges, each of which cuts a chip having a width equal to approximately one-half the diameter of the drill. The two chips produced by a drill tend to be relatively stiff and of a tight spirally wound configuration which enables them to advance upwardly through the deep spiral flutes of the drill in a smooth manner and even through a drill bushing, where a bushing is employed.

An annular hole cutting tool on the other hand has a cylindrical side wall provided with a plurality of teeth spaced circumferentially around the lower end thereof and having around its outer periphery a plurality of spiral flutes extending upwardly from the teeth. The number of teeth on an annular hole cutter is normally proportional to the diameter of the cutter. It is not uncommon to have five or six teeth on a ½" diameter annular hole cutter and eighteen or twenty teeth on a hole cutter having a diameter of 1½". As a result of its design and operation, an annular hole cutter therefor produces a substantially greater number of chips and the chips are predominantly stringy and flimsy. Such chips tend to wrap and accumulate around the outer periphery of the cutter and the arbor on which the cutter is mounted. Unless the chips are removed frequently, they tend to block the further flow of chips produced by the cutter and can result in cutter breakage. Consequently, the tangled accumulation of chips around the cutter and arbor must be removed frequently and, in many cases, after each hole is completed. The task of removing such chips is difficult and time consuming.

The primary object of this invention is to eliminate the above described problem associated with the operation of annular hole cutter.

A more specific object of the invention is to provide a chip breaker device for annular hole cutters of simple and economical construction.

Other objects, features and advantages of the present invention will become apparent from the following description and accompanying drawings, in which.

Figure 1:
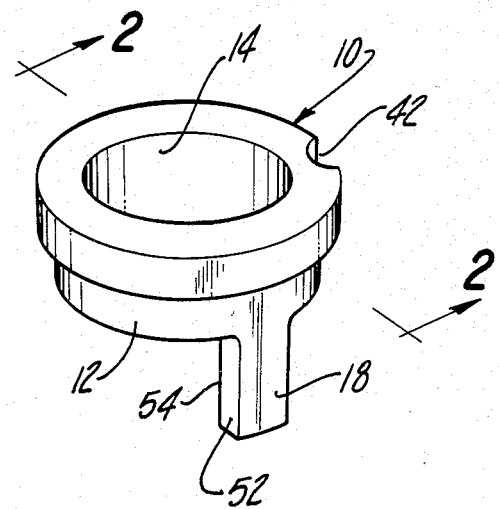
FIG. 1 is a perspective view of a bushing for an annular hole cutter embodying the chip breaker of the present invention.
Figure 2:
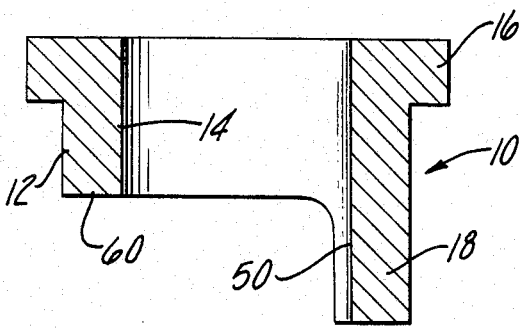
FIG. 2 is a sectional view taken along the line 2—2 in FIG. 1.

In FIG. 1 there is illustrated a drill bushing, generally designated 10, having a cylindrical side wall 12 provided with a central bore 14 sized to receive with a close fit an annular hole cutter. At its upper end wall 12 is provided with an annular outwardly extending flange 16. At one section thereof wall 12 is formed with an axially downwardly extending lug 18.

Figure 3:
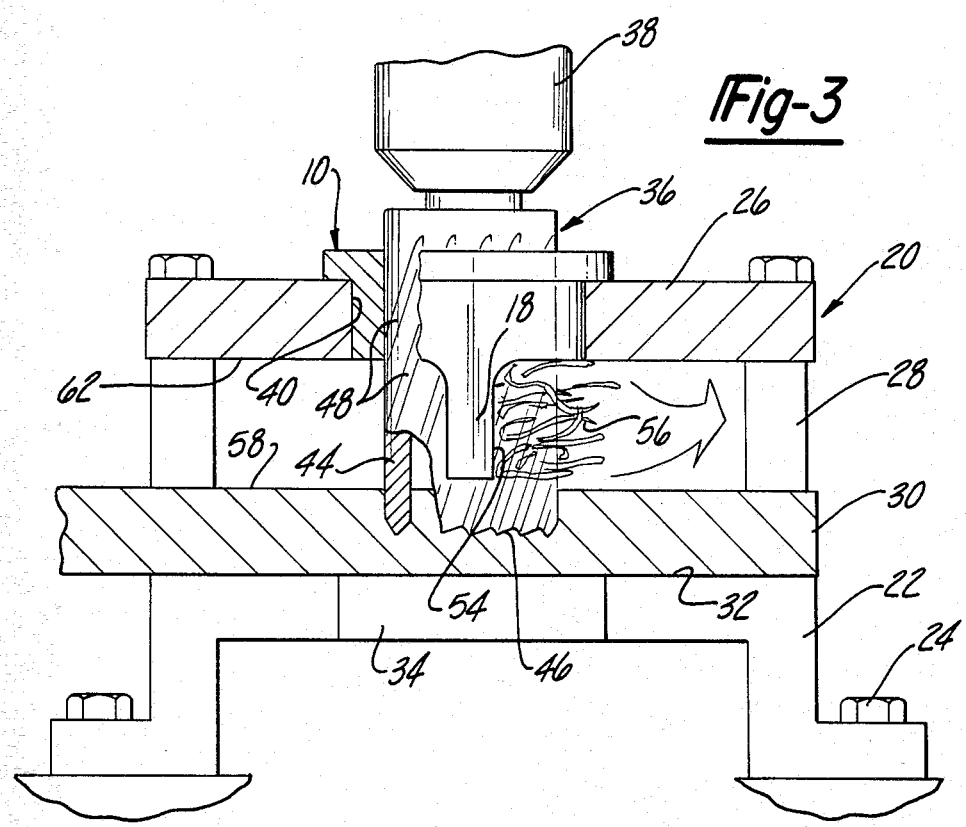
FIG. 3 is an elevational view, partly in section, showing the manner in which the chip breaker bushing illustrated in FIG. 1 is employed on a work holding fixture.

Bushing 10 is adapted to be employed on a fixture, generally designated 20 in FIG. 3. This fixture comprises a base 22 adapted to be secured in any suitable fashion, as by screws 24, on the table of a drilling machine. Fixture 20 has a top plate 26 mounted on base 22 by means of bolt and spacer assemblies 28. A workpiece 30 in which it is desired to cut a hole is adapted to be supported in fixed position on the flat top face 32 of base 22. Base 22 is formed with an aperture 34 to accommodate an annular hole cutter 36 mounted on the chuck or arbor 38 of the drilling machine. Plate 26 is supported in spaced relation above the workpiece 30 on base 22 and is formed with an aperture 40 generally concentric to aperture 34 in base 22. Aperture 40 is sized to receive bushing 10. Bushing 10 is adapted to be secured in fixed position on top plate 26 by any suitable means, such as by a screw on top plate 26 engaging an arcuate notch 42 in flange 16. It is understood, of course, that the outer diameter of cutter 36 corresponds closely to the diameter of bore 14 in bushing 10.

Cutter 36 is of the type having a cylindrical side wall 44 provided with a plurality of teeth 46 spaced circumferentially around the lower end of the cutter. A plurality of helical flutes 48 extend upwardly from teeth 46 around the outer periphery of side wall 44. It will be observed that the chip breaker lug 18 extends radially outwardly from the outer periphery of cutter 36 between the top face of the workpiece 30 and the bottom face of top plate 26. The curved inner face 50 of lug 18 is disposed closely adjacent the outer periphery of the cutter side wall 44. The opposite side faces 52 of lug 18 intersect the inner face 50 in vertically extending straight edges 54.

With the parts arranged in the manner illustrated in FIG. 3, when cutter 36 is rotated and fed into the workpiece 30, the teeth 46 cut an annular groove in the workpiece and thereby produce a large mass of long stringy chips, generally designated 56 in FIG. 3, which advance in a generally upward and outward direction. The chips 56 flow upwardly within that portion of flutes 48 disposed below the top face 58 of workpiece 30. Because these chips are rotating within the flutes of the cutter and are, therefore, subjected to centrifugal force, as soon as they emerge from the top face 58 of the workpiece they are no longer confined radially and tend to flare outwardly in an upward direction. A large portion of the chips so formed will tend to be promptly broken as they rotate into engagement with the leading face 54 of chip breaker lug 18 as shown in FIG. 3. In any event, the extent of the flow of chips in an upwardly direction is arrested by the lower face 60 of bushing 10 and the lower face 62 of top plate 26. Even the longer chips will be eventually broken. They cannot wrap around the cutter because the chip breaker lug 18 extends downwardly from the bottom face 60 of the cutter to substantially the top face 58 of base 22. Thus, by reason of the chip breaker lug 18 and the faces 58,60,62, the chips are prevented from wrapping around the cutter and are broken by lug 18. The mass of chips, most of which are relatively short, having been broken by engagement with lug 18, are caused to flow readily in a laterally outward direction away from the cutter. Therefore, they do not tend to clog flutes 48.

Figures 4, 5:
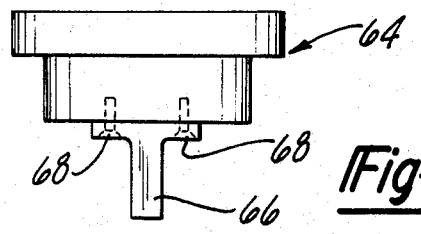
FIG. 4 is an elevational view of a modified form of bushing.
FIG. 5 is a perspective view of the chip breaker element that is shown mounted on the bushing illustrated in FIG. 4.

The bushing 64 illustrated in FIG. 4 is generally the same as that shown in FIG. 1, except that the chip breaker lug 66 is formed separately from the bushing proper and is adapted to be fixedly mounted thereon by means of screws 68. In the case of bushing 64, chip breaker lug 66 is generally T-shaped in elevation as shown in FIG. 5 and has an arcuate inner surface to conform with the bore of the bushing. If desired, chip breaker 66 can be mounted on bushing 64 so that its inner face is spaced slightly radially outwardly from the bore in the bushing, but not more than about 0.020". An efficient chip breaking action is obtainable only if the inner face, or at least the inner edge of the leading side face, of the chip breaker is disposed closely adjacent the outer periphery of the cutter.

Figure 6:
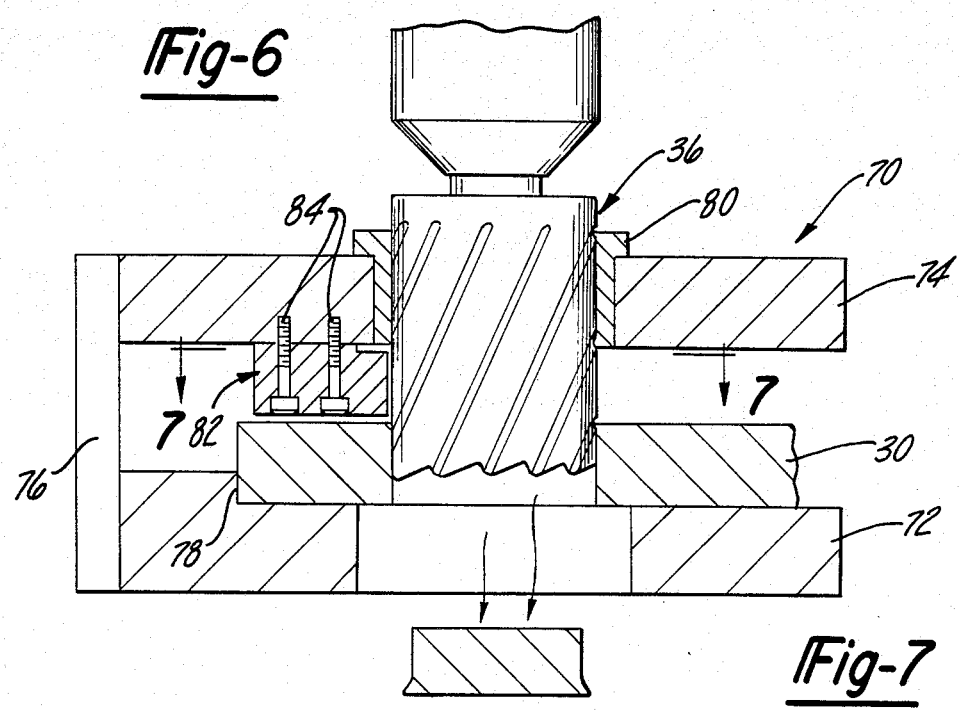
FIG. 6 shows a work holding fixture which includes another form of chip breaker according to the present invention.
Figure 7:
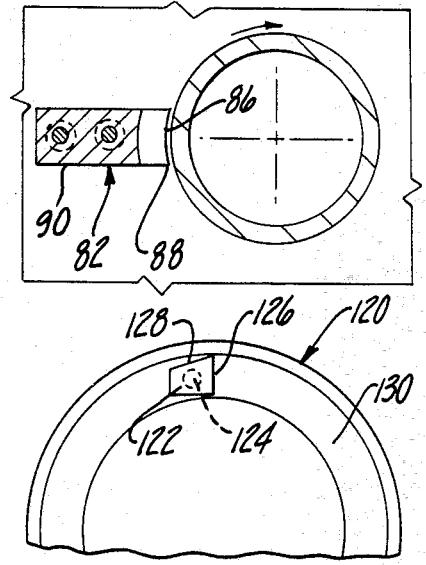
FIG. 7 is a sectional view along the line 7—7 in FIG. 6.

In FIG. 6 there is illustrated a slightly modified form of fixture, generally designated 70, which includes a base plate 72, a top plate 74 and a bracket 76 securing the two plates together in vertically spaced relation. Base plate 72 is provided with any suitable means, such as a shoulder 78, for supporting the workpiece 30 in fixed position on the fixture. Top plate 74 supports a conventional drill bushing 80 sized to correspond with the outer diameter of cutter 36. In this arrangement the chip breaker is in the form of a flat vertically extending block 82 secured to the underside of plate 74 by screws 84. Chip breaker block 82 is disposed generally radially with respect to cutter 36 and its inner face 86 is disposed closely adjacent the outer periphery of the cutter side wall. As in the case of the bushing shown in FIG. 1, chip breaker block 82 is formed with a straight vertically extending leading inner edge 88 and a flat leading face 90 against which the chips produced by the cutting action are abutted as they rotate with the cutter. The inner face 86 may be flat instead of curved, in which case, depending upon the size of the cutter, the breaker may be angled to the periphery of the cutter or the inner face 86 may be inclined at an acute angle to the side face 90 so that the edge 88 will be directly adjacent the periphery of the cutter. The chip breaking action of the arrangement shown in FIG. 6 is substantially the same as that produced in connection with the arrangement shown in FIG. 3. Most of the chips formed are broken into small pieces and, in any event, they are caused to flow smoothly in a laterally outward direction away from the cutter.

Figure 8:
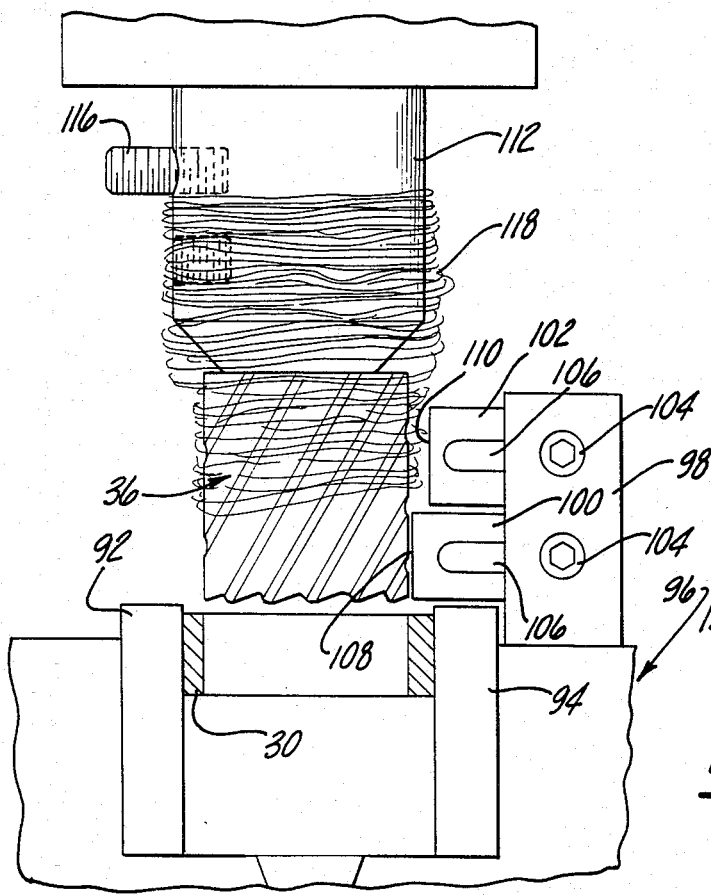
FIG. 8 is a fragmentary elevational view of another type of fixture for supporting a workpiece and a further modified form of chip breaker.

A further modified arrangement is shown in FIG. 8 wherein the workpiece 30 is adapted to be clamped between the jaws 92,94 of a work holding vise 96. A bracket 98 is rigidly mounted on one of the vise jaws. Vertically spaced chip breaking plates 100,102 are mounted on bracket 98 by means of clamping screws 104. The chip breaking plates 100,102 are spaced one above the other and each is provided with an elongated horizontal slot 106 for enabling adjustment of the plate in a direction radially of cutter 36. The lower plate 100 is adjusted radially so that its inner end 108 is disposed closely adjacent the outer periphery of the cutter and the upper plate 102 is adjusted so that its inner edge 110 is disposed closely adjacent the cylinder of revolution of the outer surface of arbor 112 in which cutter 36 is mounted. Cutter 36 is preferably mounted in arbor 112 by means of two screws 114,116. Screw 116 is dimensioned in length so that, when it is tightened to rigidly clamp the cutter in the arbor, it projects radially outwardly from the arbor as shown in FIG. 8.

With the arrangement shown in FIG. 8, while some of the chips will be broken as they are formed by the lower chip breaker 100, other long stringy chips, generally designated 118, may wrap around the cutter and the arbor 12 above chip breaker 100. However, as the cutter is fed downwardly through the workpiece chip breaker 100 will break and remove the chips wrapped around the cutter and chip breaker 102 will break and remove the chips which become wrapped around the arbor. It will be appreciated that to accomplish this the inner edges of the two chip breakers must be located very close, preferably not more than about 0.020" from the respective members from which they remove the chips.

Figure 9:
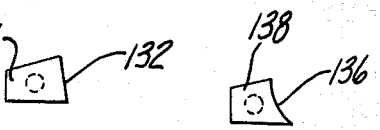
FIG. 9 is a bottom plan view of a further modified form of a chip breaker bushing.

In FIG. 9 there is illustrated a drill bushing 120 on the bottom face of which is mounted a chip breaker 122 as by a screw 124. The leading face 126 of chip breaker 122 is disposed radially to the axis of the bushing and the outer face 128 is relieved so that it will lie within the radial extent of the bushing side wall 130.

Figures 10, 11:
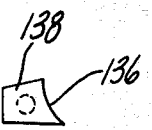
FIGS. 10 and 11 show alternate forms of chip breakers that may be mounted on the bushing illustrated in FIG. 9.

FIGS. 10 and 11 show alternate forms of chip breakers that can be mounted on a drill bushing such as illustrated at 120 in FIG. 9 and 64 in FIG. 4. The leading face 132 of chip breaker 134 shown in FIG. 10 is inclined at an acute angle to the radially inner face of the chip breaker. In FIG. 11 the leading face 136 of chip breaker 138 is formed as an arcuate surface, the radially inner portion of which is inclined at an acute angle to the radially inner face of the chip breaker. The modifications shown in FIGS. 10 and 11 illustrate the fact that the leading face of the chip breaker need not extend exactly radially to the axis of the cutter; they may be inclined or curved slightly so that they are merely generally radial to the axis of the cutter.

I claim:

1. A chip breaking device for use with a rotating annular cutter for forming holes in a workpiece by advancing the cutter through the workpiece, the cutter being of the type having a cylindrical side wall provided with a plurality of cutting teeth spaced circumferentially around the leading end of the cutter and a plurality of helical flutes extending upwardly from said teeth around the outer periphery of the side wall, comprising support means adapted to be positioned in a fixed relation to the workpiece while the cutter is being rotated and advanced axially through the workpiece, a chip breaker fixedly mounted on said support means, said chip breaker including a lug having a leading face and a trailing face extending axially of the cutter and radially to closely adjacent the cylinder of revolution generated by the outer periphery of the cutter side wall, said lug and support means being disposed relative to each other such that one axial end of the lug extends axially to closely adjacent the face of the workpiece in which the hole is to be formed and is spaced axially from said face of the workpiece a distance substantially less than the axial length of said lug, said lug and support means also being disposed relative to each other such that the peripheral zone around the cutter is unobstructed on circumferentially opposite sides of the lug and throughout the axial length of the lug for a circumferential extent substantially greater than the maximum circumferential extent of the lug between said leading and trailing faces, said lug having an axial length substantially greater than the circumferential extent of the lug between said leading and trailing faces, whereby chips cut by the cutter teeth advance axially upstream through the flutes of the rotating cutter, flare radially outwardly into said unobstructed zone as they emerge from the face of the workpiece in which the hole is being cut and impinge against and are severed by said leading face of said lug.

2. A chip breaking device as called for in claim 1 including abutment means located closely adjacent the axially upstream end of said lug in relation to the feed direction of the cutter for limiting the extent to which chips produced by the cutter are permitted to be displaced in said upstream direction.

3. A chip breaking device as called for in claim 2 wherein said abutment means comprises a stop face lying in a plane generally perpendicular to the central axis of the cutter, said stop face forming the axially upstream end of said unobstructed zone.

4. A chip breaking device as called for in claim 1 wherein said support means comprises a first support member for supporting the workpiece in fixed position, a second support member spaced from the first support member and lying in a plane generally perpendicular to the feed direction of the cutter, said support members being disposed such that the workpiece supported on the first member underlies the second member, said second support member having an opening therein through which the cutter is adapted to be fed to form the hole in the workpiece, said lug being fixedly mounted on one of said support members.

5. A chip breaking device as called for in claim 4 wherein said opening comprises a circular bore of a guide bushing for the cutter fixedly mounted on the second member, said bushing having an end face at the axially downstream end of said bore, said lug projecting axially in a downstream direction from said end face of said guide bushing.

6. A chip breaking device as called for in claim 5 wherein said lug forms an integral extension on said bushing.

7. A chip breaking device as called for in claim 1 including means for mounting said lug on said support means for adjustment in a direction radially of the cutter so that the radially inner side of said lug can be disposed directly adjacent the outer periphery of cutters of different diameters.

8. A chip breaking device as called for in claim 1 wherein the chip breaker consists of a single said lug.

9. A bushing for use with a rotating annular cutter for forming holes in a workpiece by advancing the cutter through the workpiece, the cutter being of the type having a cylindrical side wall provided with a plurality of cutting teeth spaced circumferentially around the leading end of the cutter and a plurality of helical flutes extending upwardly from said teeth around the outer periphery of the side wall, said bushing comprising a cylindrical wall having a bore corresponding in size with the outer diameter of the cutter and an end face at the downstream end thereof, means for mounting the bushing in fixed position on a fixture so that the cutter can be fed axially through said bore, a lug projecting axially from the downstream end face of the bushing side wall, said lug having a leading face and a trailing face extending axially of the bushing and radially to closely adjacent said bore, the peripheral zone around the bushing being unobstructed on circumferentially opposite sides thereof and through the axial extent of the lug for a circumferential extent substantially greater than the maximum circumferential extent of the lug between said leading and trailing faces, said lug having an axial length between its free end and said end face of the bushing substantially greater than its circumferential extent between said leading and trailing faces.

10. A chip breaking device for use with a rotating annular cutter for forming holes in a workpiece by advancing the cutter through the workpiece, the cutter being of the type having a cylindrical side wall provided with a plurality of cutting teeth spaced circumferentially around the leading end of the cutter and a plurality of helical flutes extending upwardly from said teeth around the outer periphery of the side wall, comprising support means adapted to be positioned in a fixed relation to the workpiece while the cutter is being rotated and advanced axially through the workpiece, a chip breaker fixedly mounted on said support means, said chip breaker including a lug having a leading face and a trailing face extending axially of the cutter and radially to closely adjacent the cylinder of revolution generated by the outer periphery of the cutter side wall, said lug and support means being disposed relative to each other such that the peripheral zone around the cutter is unobstructed on circumferentially opposite sides of said lug and throughout the axial extent of the lug for a circumferential extent substantially greater than the maximum circumferential extent of the lug between said leading and trailing faces, whereby chips cut by the cutter teeth advance upstream through the flutes of the rotating cutter, flare radially outwardly into said unobstructed zone as they emerge from the face of the workpiece in which the hole is being cut and impinge against and are severed by said leading face of said lug, said chip breaking device including a second lug on said support means extending generally radially of the axis of rotation of the cutter, means on said support means for adjusting said second lug in a direction radially of said axis, said first and second mentioned lugs being spaced apart axially relative to the axis of the cutter so that, as the cutter is advanced into the workpiece, the first-mentioned lug will break at least some of the chips which might tend to accumulate around the cutter and the second-mentioned lug will break chips that escape breakage by the first lug and might tend to accumulate around the rotating arbor on which the cutter is mounted.

* * * * *